(No Model.)

J. D. DAVIES.
DIFFERENTIAL CHAIN BLOCK.

No. 253,189. Patented Feb. 7, 1882.

Attest.
Jno. W. Layman
L. M. Bond

Inventor.
Joseph D. Davies.
by James H. Layman
Attorney.

UNITED STATES PATENT OFFICE.

JOSEPH D. DAVIES, OF BOND HILL, OHIO.

DIFFERENTIAL CHAIN-BLOCK.

SPECIFICATION forming part of Letters Patent No. 253,189, dated February 7, 1882.

Application filed November 14, 1881. (No model.)

*To all whom it may concern:*

Be it known that I, JOSEPH D. DAVIES, of Bond Hill, Hamilton county, Ohio, have invented certain new and useful Improvements in Differential Chain Blocks or Hoists, of which the following is a specification.

My invention comprises a novel combination of housing, master-wheel, driving-shaft, pinion or pinions, fixed circular rack, and toothed hoisting-sheave, whereby the immense power inherent in differential gearing is made available for chain blocks or hoists, the details of this combination being hereinafter more fully described, and pointed out in the claims.

Figure 1:
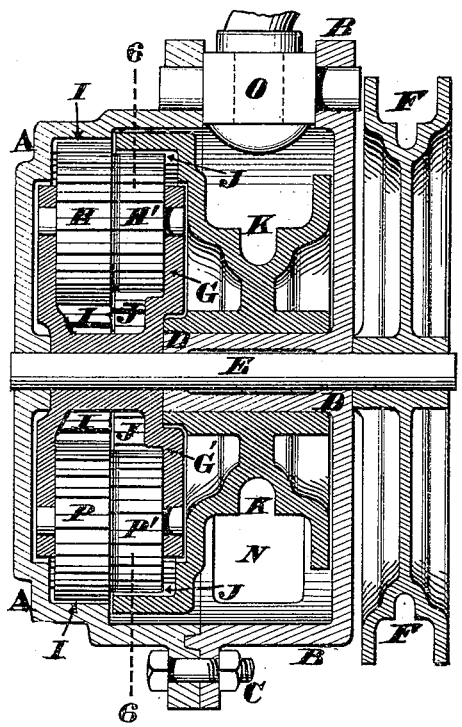
Figure 2:
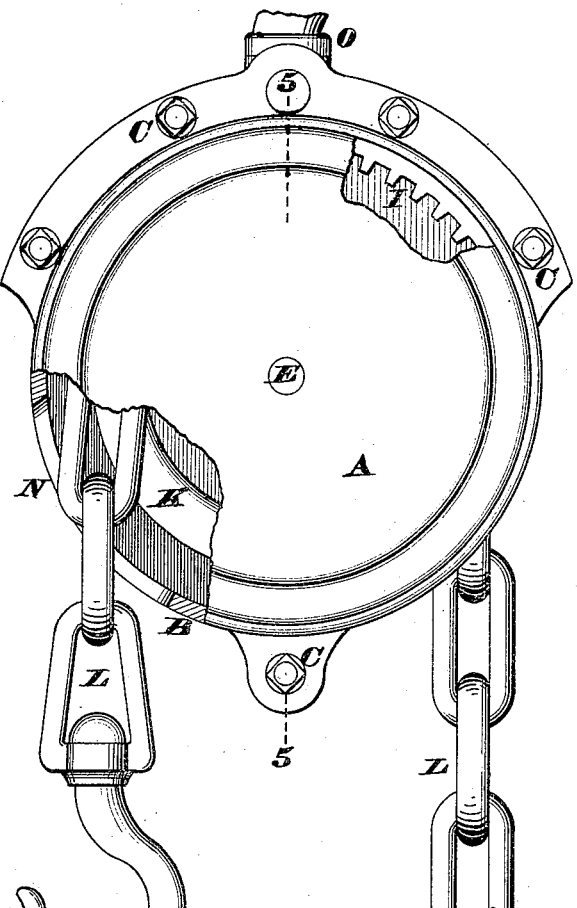
Figure 3:
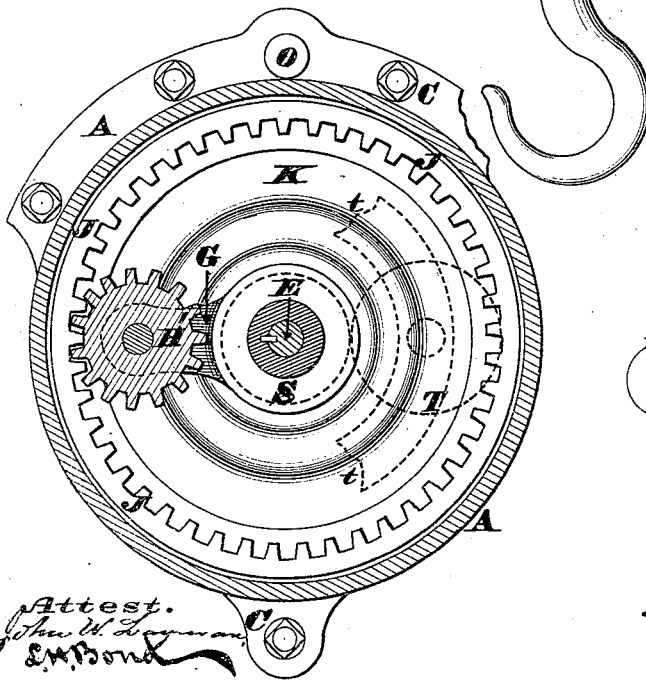
Figure 4:
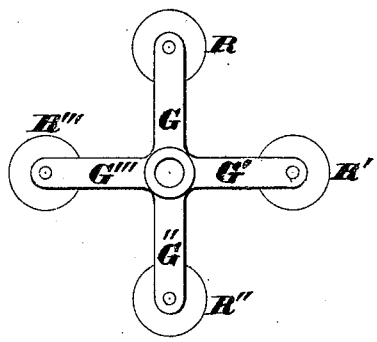

In the annexed drawings, Figure 1 is a vertical section of my differential chain-block, taken at the line 5 5 of Fig. 2, which latter illustration is a side elevation of the device, the housing of the same being broken away in places, so as to expose portions of the fixed circular rack and sheave. Fig. 3 is a transverse section at the line 6 6 of Fig. 1. Fig. 4 is a diagram representing a modified arrangement of the pinions.

The housing of my hoist or block is composed of two approximately-cylindrical shells, A B, clamped firmly together by bolts C, so as to cause the inner or open ends of said shells to engage with each other, as seen in Fig. 1. Furthermore, the shell B has an inwardly-projecting box, D, that affords a journal-bearing for driving-shaft E, to which latter is keyed a master-wheel, F, capable of being operated either with an endless chain or rope, or otherwise. Secured to the opposite end of shaft E, as more clearly seen in Fig. 3, is an arm or crank, G, having journaled in it a double pinion, H H', that imparts motion from said shaft to the hoisting-sheave. This pinion may be a single casting, or it may be composed of two separate wheels securely united together; but in either event the pitch of the teeth of member H must agree with the pitch of the teeth of a fixed circular rack, I, that projects inwardly from the housing A, as more clearly seen in Fig. 2. The pitch of the teeth of the other member, H', of the aforesaid pinion corresponds with the pitch of an internally-toothed rim, J, of the hoisting-sheave K, which latter is adapted to rotate around the bearing D.

When a power of thirty to one is required twenty-nine cogs may be provided in the fixed circular rack I, thirty cogs in the sheave-rim J, and ten cogs or teeth in each of the pinions H H'; but these proportions can be varied to suit circumstances. In case the diameter of the circular rack at its pitch-line should be larger than that of the sheave-wheel, and the pinions H H' have the same number of cogs, said rack will then have less teeth than the sheave, and the rack I and its pinion H will each have a greater pitch than the sheave-rim J and its pinion H'.

It is not essential to have the same number of cogs in the two members H H' of the pinion, nor that the fixed rack should be larger than the sheave-rim, as seen in Fig. 1, for if said rack should be smaller than said rim the sheave K would then revolve in a direction contrary to shaft E; but in this case the power of the hoist will be decreased in accordance with the difference between the diameter of rack I and toothed rim J.

L is the hoisting chain, engaging with the sheave K in the usual manner, said chain being free to traverse two opposite slots in the housing B, one of said slots being shown at N in Figs. 1 and 2.

O is a swivel-bearing for attachment of a hook or shackle or other supporting device.

From the above description it is evident that when shaft E is rotated by master-wheel F the arm or crank G will be carried around with said shaft, thereby causing pinion H H' to revolve on account of its member H engaging with the fixed circular rack I. Now, if the pitch-lines of rack I and rim J were equal, it is evident this pinion would simply wallow in the teeth of said members I J, and without imparting motion to the sheave K; but as the pitch-line of rim J is of less diameter than that of the rack the sheave is compelled to revolve in exact accordance with this difference. Therefore, if the rack has twenty-nine teeth, the sheave thirty, and the pinions H H' have ten, the members H H' must perform thirty revolutions around the shaft E to turn sheave K once on its bearing D, thus increasing the power as thirty to one.

The above is a description of the more simple construction of my chain-block, but the details thereof may be modified in various ways— as, for example, the arm or crank G may be supplemented with another arm, G', carrying a pinion, P P'. (Seen in Fig. 1.) If this latter pinion should be located diametrically opposite the pinion H H', which is the preferred position, then the teeth of the member P should be in line with the interdental spaces of the other member, P'. Or four arms, G G' G'' G''', may be employed, as seen in Fig. 4, each of said arms having journaled in it a pinion composed of two members, the pinion R having its two distinct sets of teeth exactly in line with each other.

The teeth of one member of pinion R' should be one-fourth of a pitch ahead of the teeth of the other member of said pinion. The teeth of one member of pinion R'' should be set one-half of a pitch ahead of the teeth of the other member of said pinion. The teeth of one member of pinion R''' should be set three-fourths of a pitch ahead of the teeth of the other member of said pinion. Or shaft E may have keyed to it a single pinion, (shown by the dotted line S in Fig. 3,) said pinion S being arranged to gear with another one, (indicated by the dotted line T,) which latter is to engage both with the rack I and rim J in the same manner as does the pinion H H'. This system of pinions may be duplicated as many times as the size of the housings will permit, provided the pinions similar to the one T do not come in contact with each other, which contact can be avoided by journaling said pinions in two rings, of which rings a portion of one is indicated by the dotted lines t. By thus employing four pinions similar to the pinion T the power of the block will be increased fourfold. Finally, the device may be used in connection with a snatch-block and doubled chain, so as to again increase the power.

I claim as my invention—

1. The combination, in a chain-block, of a driving-shaft operating a pinion composed of two members, one of which engages with a fixed circular rack, while the other member gears with the hoisting-sheave, the pitch-lines of said rack and sheave-rim being of different diameters, for the purpose specified.

2. The combination, in a chain-block, of driving-shaft E, arm G, pinion H H', fixed circular rack I, and toothed sheave-rim J, the pitch-lines of said rack and sheave-rim being of different diameters, for the purpose specified.

3. The combination, in a chain-block, of driving-shaft E, arms G G', pinions H H' P P', fixed circular rack I, and toothed sheave-rim J, the pitch-lines of said rack and sheave-rim being of different diameters, as and for the purpose specified.

4. The combination, in a chain-block, of housings A B, box D, driving-shaft E, master-wheel F, arm G, pinion H H', fixed circular rack I, toothed sheave-rim J, and sheave K, the pitch-lines of said rack and sheave-rim being of different diameters, as and for the purpose specified.

In testimony whereof I affix my signature in presence of two witnesses.

JOSEPH D. DAVIES.

Witnesses:
HENRY DAVIES,
C. C. HARRIS.